Nov. 7, 1967 J. R. BORDEN ET AL 3,351,835
CONSTANT VOLTS-PER-CYCLE ENERGIZING SYSTEM IN WHICH THE
FREQUENCY OF THE ENERGY IS FIRST ADJUSTED AND
THEREAFTER THE AMPLITUDE OF THE ENERGY IS
REGULATED TO MAINTAIN A PRESET
VOLTS-PER-CYCLE RATIO
Filed June 10, 1964 3 Sheets-Sheet 1
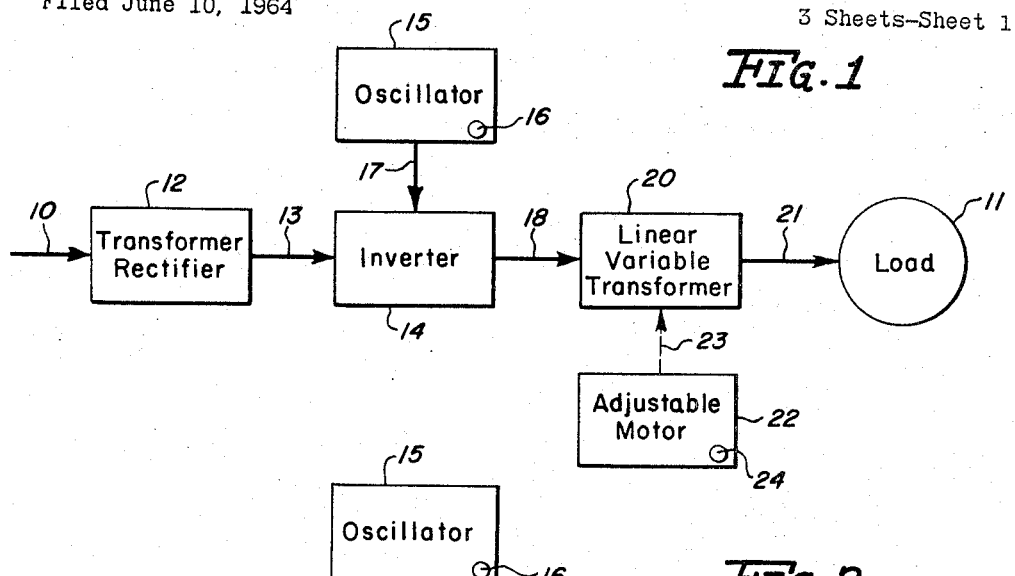
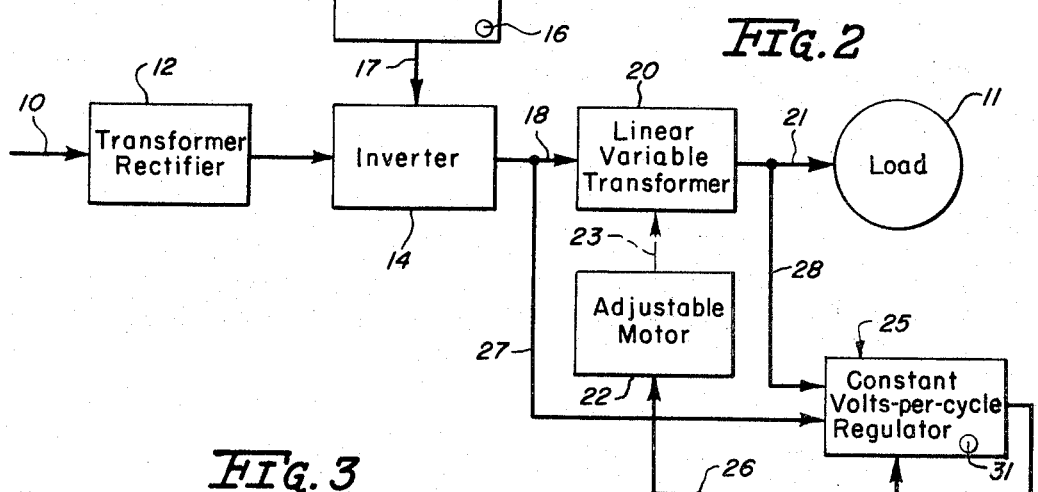
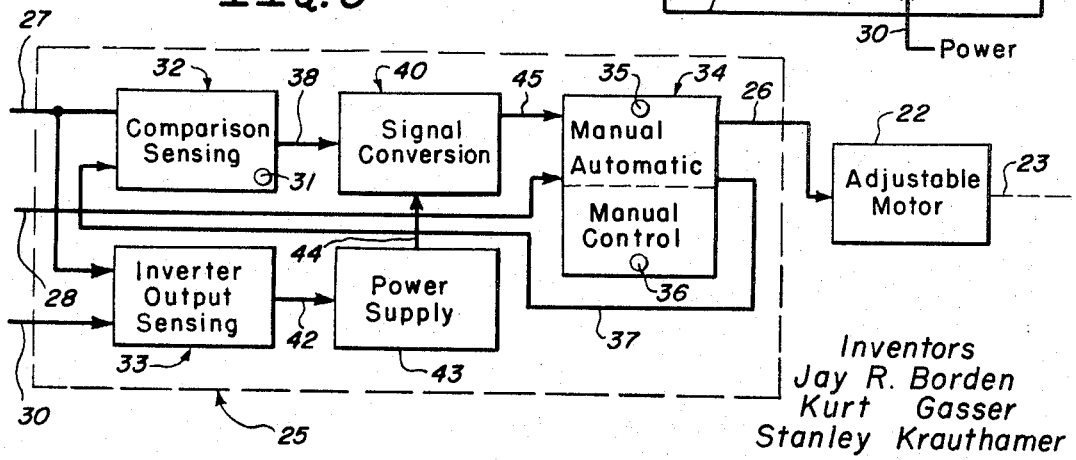
Inventors
Jay R. Borden
Kurt Gasser
Stanley Krauthamer
By *James J. Jennings, Jr.*
Attorney

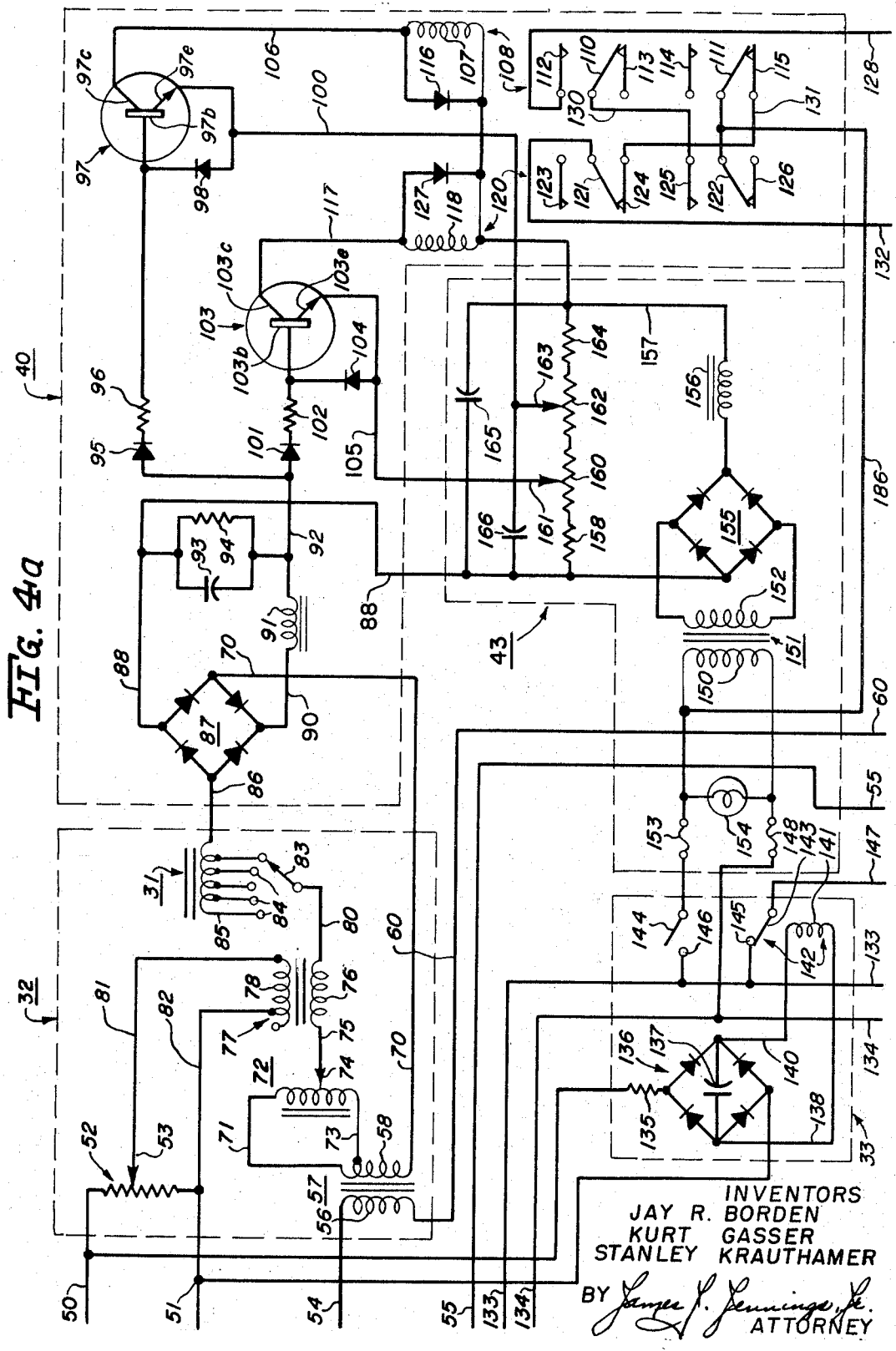

United States Patent Office 3,351,835
Patented Nov. 7, 1967

3,351,835
CONSTANT VOLTS-PER-CYCLE ENERGIZING SYSTEM IN WHICH THE FREQUENCY OF THE ENERGY IS FIRST ADJUSTED AND THEREAFTER THE AMPLITUDE OF THE ENERGY IS REGULATED TO MAINTAIN A PRESET VOLTS-PER-CYCLE RATIO
Jay R. Borden, Santa Ana, Kurt Gasser, Orange, and Stanley Krauthamer, Monterey Park, Calif., assignors to Borg-Warner Corporation, Chicago, Ill., a corporation of Illinois
Filed June 10, 1964, Ser. No. 374,065
13 Claims. (Cl. 318—227)

ABSTRACT OF THE DISCLOSURE

To energize an induction motor with energy at a constant volts-per-cycle ratio, AC energy received at a transformer rectifier is changed to a substantially constant DC voltage utilized to energize an inverter. An oscillator regulates the frequency of the inverter output energy, and *after* this frequency is regulated the amplitude is adjusted by passing the output energy through a linear variable transformer to the motor. The transformer has its setting adjusted through an adjusting motor which in turn is driven by a constant volts-per-cycle regulator. This regulator includes: a comparison sensing stage having an adjustable impedance for presetting the desired volts-per-cycle ratio, an input circuit for receiving a signal which is a function of the amplitude of the voltage passed to the motor, and an output circuit for providing a control signal connoting conformity of the system with the preset ratio, or a deviation in either direction of the volts-per-cycle ratio; a signal conversion stage for receiving the control signal and, through the intermediary of a manual/automatic switching stage, for driving the adjusting motor in the proper direction to reduce any deviation from the preset volts-per-cycle ratio; and an inverter output sensing stage for providing energy to the power supply which energizes the signal conversion stage responsive to operation of the inverter.

Background of the invention

The present invention is directed to a control system for regulating the volts-per-cycle ratio of energy applied to an electrical load, such as an induction motor, and more particularly to such a system which, after the frequency of the alternating supply energy has been adjusted, adjusts the level of the output energy supplied to the load to conform to a preset volts-per-cycle ratio.

The present invention finds utility in different arrangements for energizing an electrical load, but those skilled in the art will appreciate that the volts-per-cycle ratio of energy supplied to an induction motor is a characteristic which requires amplitude regulation if the frequency is varied, and thus the system will be described in connection with the energization of such a motor. The motor speed can be regulated by controlling the frequency of the energizing voltage, necessitating that the amplitude of the energizing voltage be regulated with each frequency change to maintain a substantially constant volts-per-cycle ratio. Various systems have been devised to effect such regulation, but all have had various shortcomings from the standpoints of complexity, expense, maintenance or undue physical size.

It is, therefore, a primary object of the present invention to provide a novel and unobvious control system operable to afford regulation of the frequency of energy passed from an inverter to an induction motor, and after the frequency is controlled, an appropriate adjustment of the amplitude of the energizing voltage is made to maintain constant the volts-per-cycle ratio of the energy which operates the induction motor.

It is an important object of the invention to provide a system which, after the frequency of the inverter output voltage has been established, senses the energy passed to the motor and compares it against a preset volts-per-cycle ratio level, to effect an automatic amplitude adjustment of the energy supplied to the motor in conformance with such preset volts-per-cycle ratio.

Summary of the invention

The present invention, in one embodiment, comprises a control system including a transformer rectifier which receives alternating input energy and provides a substantially constant DC output voltage for energizing an inverter. The inverter operates in a well known manner to provide an alternating output potential, the frequency of which is regulated by a suitable regulating means, such as an oscillator coupled to the inverter. A variable amplitude transformer is coupled between the output of the inverter and the induction motor, with the output level of this transformer being adjusted to maintain constant the volts-per-cycle ratio of the energy passed from the transformer to the induction motor or other load.

In another embodiment of the invention, a regulating means or a volts-per-cycle regulator is coupled to the output side of the inverter and to the output side of the variable transformer, to compare the energy supplied from the inverter over the transformer against a predetermined volts-per-cycle ratio. Any deviation from the preset level is signified by a control signal provided to operate an adjusting means or adjusting motor which regulates the level of the transformer output voltage to maintain substantially constant the volts-per-cycle ratio of the energy supplied to the load.

The drawings

In the several figures of the drawings, like reference numerals identify like elements, and in those drawings:

FIGURE 1 is a block diagram of a control system for regulating energization of an electrical load in accordance with the inventive teachings;

FIGURE 2 is a block diagram of a system generally similar to FIGURE 1 but, in accordance with another aspect of the invention, including a volts-per-cycle regulator;

FIGURE 3 is a block diagram depicting components of the volts-per-cycle regulator illustrated in FIGURE 2; and FIGURES 4A and 4B together comprise a schematic diagram illustrating the circuit details of the volts-per-cycle regulator of FIGURE 3.

General system description

Figure 4B:
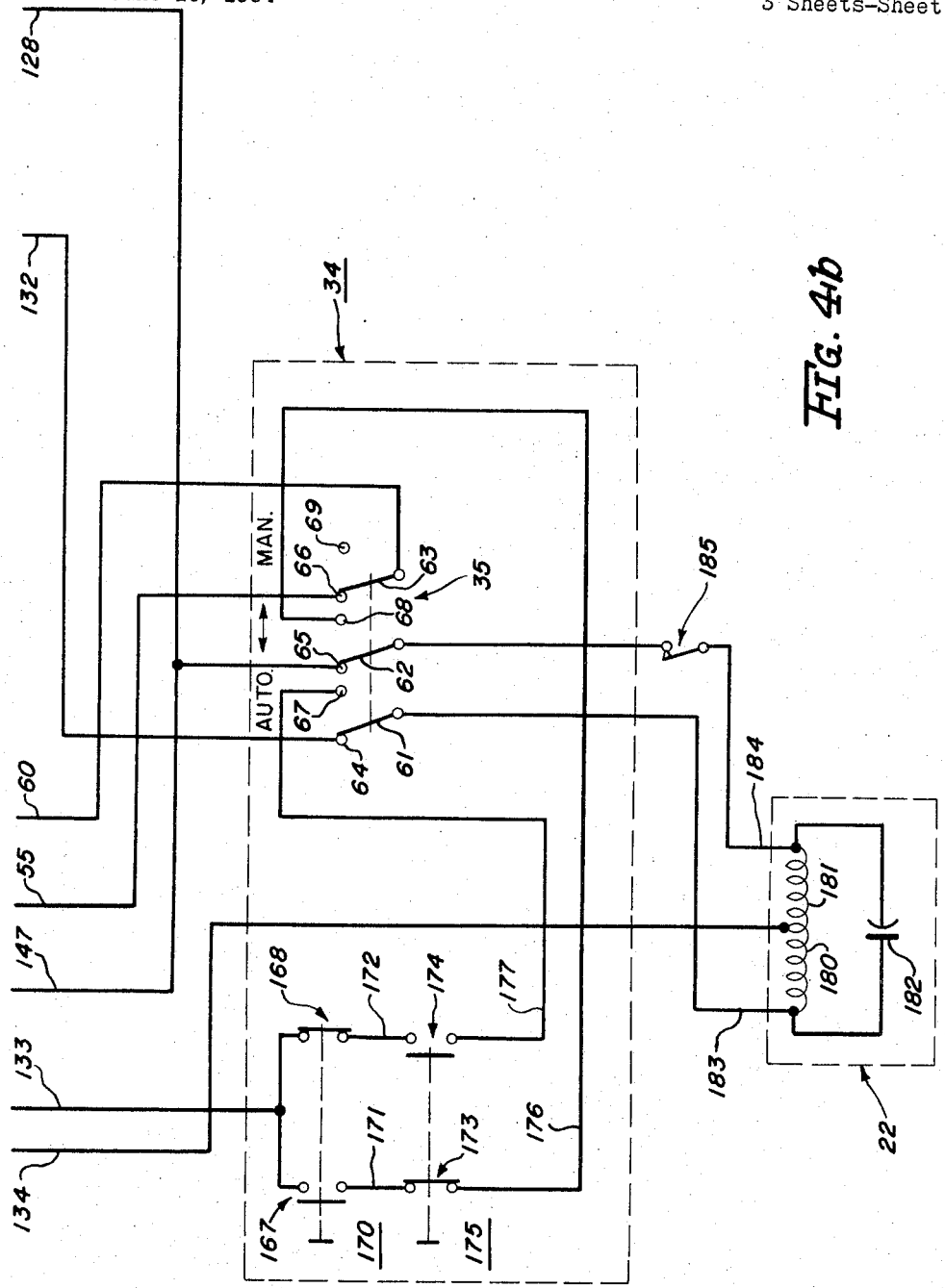

Referring to FIGURE 1, the block diagram indicates generally a control system for regulating volts-per-cycle ratio of electrical alternating energy supplied from a suitable source over conductor 10 for energizing a load 11. Those skilled in the art will appreciate that one important use of such arrangement is for the energization of an induction motor, to maintain substantially constant the volts-per-cycle ratio of the electrical input energy. Three-phase alternating energy provided from the source is converted in transformer rectifier 12 into a substantially constant DC voltage, for application over a conductor 13 to energize an inverter 14. Those skilled in the art will appreciate that although only a single conductor is indicated at 10 or 13, actually a plurality of conductors is utilized at these locations. For example, three or four conductors would be used to supply input energy to transformer rectifier 12 (or two conductors, with a single-phase system), and a pair of conductors would be utilized at 13 to supply the unidirectional potential to the inverter. However, to maintain simplicity of the system illustrations, only a single conductor is indicated in the drawings.

An oscillator stage 15 includes an adjusting knob 16 for regulating the frequency of its output signal, which is applied over conductor 17 to regulate the frequency of alternation of the inverter output voltage which appears on conductor 18. At this point in the system the frequency of the energizing potential has been established.

A variable transformer unit 20 receives the alternating energy from the inverter and applies it over conductor 21 to load 11. Transformer 20 may be linear, that is, the individual phase windings may be disposed on a linear portion of the core, or the core can be of circular or other configuration. With a linear transformer, a linear displacement of an adjustable tap or connection on the transformer is effective to produce a related adjustment of the output voltage on conductor 21 in a well known manner. An adjusting motor 22 is mechanically coupled, as represented by broken line 23, to transformer 20 to displace the adjustable tap or connection on transformer 20 in response to displacement of control knob 24 on the adjusting motor. Such arrangements, of a variable amplitude transformer and its adjusting motor, are well known in the art.

Accordingly frequency regulation is effected by manipulation of knob 16 to control the frequency of the oscillator output signal and thus the frequency of the inverter output voltage, and the amplitude of the motor energizing voltage can be regulated by manipulating control knob 24 of adjusting motor 22. Thus, in accordance with the inventive teaching, a desired volts-per-cycle ratio of the energy supplied over line 21 is produced by the appropriate regulation of control knobs 16 and 24 in this novel system.

*System with volts-per-cycle regulator*

Although the system shown in FIGURE 1 provides a good adjustment of the volts-per-cycle ratio of the system output energy, two separate adjustments are required to effect the frequency and voltage level regulation. Clearly it would be desirable if the constant volts-per-cycle load energization could be maintained after adjusting only the frequency of the inverter output voltage, without another manual displacement of adjusting motor knob 24. This desirable operation is achieved by the system shown in FIGURE 2, by the inclusion of constant volts-per-cycle regulator 25.

The transformer rectifier 12, inverter 14, oscillator 15, transformer 20 and adjusting motor 22 are also shown in FIGURE 2, intercoupled for energizing load 11. However, instead of a manual correction for the amplitude of the transformer output voltage (as by knob 24 in FIGURE 1), constant volts-per-cycle regulator 25 is connected to provide a control signal over line 26 for operating adjusting motor 22 to effect the desired amplitude regulation of the voltage applied to the load. Regulator 25 receives a first input signal over line 27, from the output side of inverter 14 (or from the input side of transformer 20). Another input signal is derived from the output side of transformer 20, and applied over line 28 to regulator 25. Input power is supplied over line 30 to the regulator, and control knob 31 is used to preset a desired volts-per-cycle ratio which it is desired to maintain on output conductor 21. Regulator system 25 is effective to compare the signals on conductors 27 and 28 against the preset reference, and to provide over conductor 26 a suitable signal for operating adjusting motor 22 in the proper direction to eliminate any deviation in the volts-per-cycle ratio of the transformer output voltage from the desired reference value preset by actuation of knob 31.

*General description of volts-per-cycle regulator*

FIGURE 3 indicates major components of the constant volts-per-cycle regulator depicted as a single block 25 in FIGURE 2. As shown in FIGURE 3, line 27, on which the output signal from inverter 14 appears, applies an input signal both to comparison sensing stage 32 and to inverter output sensing stage 33. Stage 32 includes an adjusting means 31 for presetting the desired volts-per-cycle ratio to be maintained by the system. The signal from the output side of transformer 20 which appears on conductor 28, is not applied directly to comparison sensing stage 32 but is applied to the input side of manual/automatic switching stage 34, which includes a first switching means 35 for selecting either manual or automatic system operation, and a second switching means 36 for controlling operation of adjusting motor 22 when switch 35 conditions the system for manual operation. With switch 35 in the automatic position, the signal received over conductor 28 is returned over conductor 37 to the input side of comparison sensing stage 32. As sensing stage 32 recognizes that the volts-per-cycle ratio of the signal being applied to load 11 exceeds the preset ratio, a signal indicating this condition is applied over line 38 to signal conversion stage 40. Subsequently, in connection with the explanation of FIGURES 4A and 4B, it will become apparent that the adjusting motor is energized automatically to increase the amplitude of the energizing voltage supplied load motor 11 whenever the volts-per-cycle ratio is below the preset ratio established by adjusting means 31, even though no signal appears on line 38 at this time.

Inverter output sensing stage 33 receives energy over line 30 and, upon receipt of a signal from line 27 denoting that inverter 14 is operating, passes the energy received from input line 30 over line 42 to power supply stage 43. In the power supply stage 43 alternating energy is rectified and supplied as a unidirectional potential over line 44 to energize components within signal conversion stage 40. Upon energization of these components and receipt of a signal over input conductor 38, signal conversion stage 40 provides suitable regulating signals over conductor 45, manual/automatic switching stage 34 and line 26 to regulate operation of adjusting motor 22 and thus alter the amplitude of the voltage passed by transformer 20 to motor 11. With this general outline of the major portions of the volts-per-cycle regulator, a more particularized description will now be set forth in connection with FIGURES 4A and 4B.

*Detailed description of volts-per-cycle regulator*

In general, comparison sensing stage 32, inverter output sensing stage 33, signal conversion stage 40 and power supply 43 are depicted in FIGURE 4A, with the manual/automatic switching stage 34 and adjusting motor 22 being shown in FIGURE 4B. Considering first comparison sensing stage 32 in FIGURE 4A, a pair of of input conductors 50 and 51 supply energy to opposite ends of a potentiometer 52 which includes a movable tap 53. In a single-phase system, conductors 50 and 51 are connected across the lines which intercouple the inverter and the primary side of the variable transformer; accordingly lines 50 and 51 can be considered analogous to line 27 in FIGURE 3. Likewise, line 28 in that figure is related to conductors 54 and 55 in FIGURE 4A, which in a single-phase system are coupled between the variable transformer and the load; in a three-phase system, conductors 54 and 55 are coupled across one phase of the plurality of phase conductors which intercouple the linear variable transformer with the load.

Conductor 54 is coupled to one end of primary winding 56 of transformer 57, which also includes a secondary winding 58. The other end of primary winding 56 is coupled over a conductor 60 to manual/automatic switching stage 34. In stage 34 switch arrangement 35 is shown as a three-pole, double-throw switch which includes three movable contacts or armatures 61, 62 and 63, respectively engaging fixed contacts 64, 65 and 66. Switch arrangement 35 is depicted in the "automatic" position, and upon displacement of the switch to the "manual" position, contacts 61–63 are displaced away from contacts 64–66, to engage the other contacts 67, 68 and 69, respectively. In the "automatic" position of switch 35, as shown, the circuit for primary winding 56 is completed over conductor 60, contacts 63, 66, and conductor 55.

One end of secondary winding 58 is coupled to a conductor 70, and the other end of secondary winding 58 is coupled over conductor 71 to one end portion of a Variac 72, the other end of which is coupled over a conductor 73 to a tap on secondary winding 58. The movable connection or arm 74 of the Variac is coupled over a conductor 75 to secondary winding 76 of a transformer 77, which also includes a primary winding 78. The other end of secondary winding 76 is coupled to a conductor 80. Accordingly it will be apparent that between conductors 70 and 75 there appears a signal which varies both as a function of the transformer output voltage (received over conductors 54 and 55) and the setting of arm 74 on Variac 72. It is noted that the range of adjustment can be extended by providing additional taps on secondary winding 58 and changing the connection of conductor 73 to one of these taps.

To this voltage or signal which appears between conductors 70 and 75, transformer 77 algebraically adds an offset or correction voltage. The extent of the correction is a function of the setting of arm 53 on potentiometer 52. The sense of the correcting voltage can be reversed by reversing the connections of conductors 81 and 82 to primary winding 78. Thus a positive or a negative offset voltage can be inserted as a component of the composite voltage which appears between conductors 70 and 80. Such an offset voltage is sometimes utilized near the lower end of the variable transformer range, that is, when only a low amplitude voltage is being supplied to the load or motor 11. If no offset correction is desired, potentiometer 52 and transformer 77 can be eliminated from comparison sensing stage 32.

Previously numeral 31 has been used to designate the adjusting means for regulating the desired volts-per-cycle ratio. In FIGURE 4A, adjusting means 31 is shown as an inductor, having a movable arm or contact 83 displaceable to engage one of the different taps or contacts 84, shown connected along the length of inductor winding 85. This inductor is of the well known type which has a square saturation characteristic, and essentially can be considered as passing no current until saturation occurs. When the voltage-time integral of the energy applied to that portion of winding 85 determined by the setting of movable contact 83 reaches a given value, then the inductor saturates and current begins to flow from conductor 83 through the engaged one of contacts 84 and a portion of winding 85 to conductor 86. Accordingly whenever the volts-per-cycle ratio of the signal from transformer 20, as sensed over conductors 54 and 55, equals or exceeds the ratio preset by the position of movable contact 83, current begins to flow through inductor 31 to provide a control signal over conductors 70 and 86 to signal conversion stage 40. Thus it will be seen that conductors 70 and 86 are similar to line 38 in FIGURE 3.

Considering now signal conversion stage 40, input conductors 70 and 86 are coupled to opposite terminals of rectifier bridge 87, which operates in conventional fashion as current flows therethrough to provide a unidirectional operating potential at its output conductors 88 and 90, the potential on conductor 88 being negative with respect to that on conductor 90. A smoothing inductor or filter choke 91 is coupled to conductor 90, and the other end of inductor 91 is coupled to conductor 92. Between conductors 88 and 92 is a parallel-coupled combination of capacitor 93 and resistor 94.

Conductor 92 is coupled, through a diode 95 and a resistor 96, to the base or control electrode 97b of an NPN type transistor 97. This transistor also includes an emitter or common electrode 97e, and a collector or output electrode 97c. Diode 98 is coupled between base 97b and emitter 97e, and the common connection between emitter 97e and diode 98 is coupled over conductor 100 to power supply stage 43.

Conductor 92 is also coupled through a diode 101 and resistor 102 to base 103b of NPN type transistor 103, which includes a collector 103c and an emitter 103e. Those skilled in the art with appreciate the transistors 97 and 103 can also be of the PNP type, with the appropriate reversals of the energizing and signal potentials. Diode 104 is coupled between base 103b and emitter 103e, and the common connection between diode 104 and the emitter is coupled over conductor 105 to power supply stage 43.

Collector 97c of transistor 97 is coupled over conductor 106 to one end of winding 107 of a relay 108, which relay also includes a pair of movable contacts 110, 111 and fixed contacts 112, 113, 114 and 115, shown in their de-energized positions. Transistor 97 is protected against reverse current flow when the field around winding 107 collapses by diode 116, which is coupled in parallel with winding 107.

In like manner collector 103c of transistor 103 is coupled over a conductor 117 to one end of winding 118 of relay 120, which relay also includes movable contacts or armatures 121, 122 and four fixed contacts 123, 124, 125 and 126. Diode 127 is coupled in parallel with winding 118 to protect transistor 103. Fixed contact 112 of relay 108 is coupled to a conductor 128. Movable contact 110 is coupled over conductor 130 to fixed contact 125 of relay 120. Fixed contacts 113 and 114 of relay 108 are blank, that is, not connected to any conductor. The other fixed contact 115 is coupled over conductor 131 to fixed contact 124 of relay 120. Movable contact 121 of this relay is connected to conductor 132, and contacts 123 and 126 are blank.

Considering now the inverter output sensing stage 33, energy is supplied to this stage over a pair of conductors 133 and 134 from any suitable energy source (not shown). For example, if a three-phase voltage supply is coupled to line 10 in FIGURE 1, one phase of this supply can be applied over conductors 133 and 134 to sensing stage 33. Thus it will be apparent that conductors 133 and 134 are analogous to conductor 30 in FIGURE 3.

Iit is noted that conductors 133 and 134 are coupled through inverter sensing stage 33 to the automatic/manual switching stage 34 in such a manner that some of the energy appearing on conductors 133 and 134 is always passed to the automatic/manual switching stage 34, irrespective of operation of stage 33. The importance of this connection will become apparent hereinafter in the explanation of system operation.

The same inverter output signal applied to stage 32 over conductors 50 and 51 is also applied to stage 33 by the same conductors, and over a resistor 135 to another rectifier bridge 136, connected for operation in conventional manner. A capacitor 137 is connected across the output terminals of this bridge to smooth or filter the output potential, which is applied over a pair of conductors 138 and 140 to winding 141 of a relay 142. This relay also comprises a pair of movable contacts 143 and 144, with contact 143 engaging fixed contact 145 when the relay is de-energized and contact 144 being displaced to engage fixed contact 146 upon operation of this relay. Movable contact 143 is coupled over a conductor 147 to the manual/automatic switching stage 34.

Considering now power supply stage 43, input conductor 134 is coupled over a fuse 148 to one end of primary winding 150 of a transformer 151, which includes a secondary winding 152. The other end of primary winding 150 is coupled through fuse 153 to movable contact 144. A pilot or indicating light 154 is parallel coupled with winding 150 to indicate energization of primary winding 150. It will thus be apparent that line 42 in FIGURE 3 represents the two conductors just to the left of, and connected to, fuses 148 and 153 in FIGURE 4A.

Secondary winding 152 is coupled to the input terminals of another bridge rectifier 155, the output terminals of which are coupled to conductor 88 and, through a smoothing inductor 156, to another conductor 157. A voltage divider arrangement is coupled between conductors 88 and 157, which arrangement includes a resistor 158, potentiometer 160 having a movable arm 161, potentiometer 162 having a movable arm 163, and a resistor 164. A filter capacitor 165 is also coupled between conductors 88 and 157, and another filter capacitor 166 is coupled between conductor 88 and movable arm 163, to which arm conductor 100 is also coupled. It is noted that conductor 105 is coupled to movable arm 161. Thus the bias values for transistors 97 and 103 are established by the settings of movable arms 163 and 161, respectively. It will be apparent that, with the connection shown of rectifier bridge 155, a more positive potential (relative to conductor 88) is applied over conductor 100 than is applied over conductor 105. Accordingly, as a control signal is passed over conductor 92, transistor 103 conducts "earlier" or with a lower level of control signal than does transistor 97.

Considering now manual/automatic switching stage 34 shown in FIGURE 4B, conductor 133 is connected both to normally open contact set 167 and a normally closed contact set 168, both of which have their operation regulated by actuation of "lower" push button 170. These contact sets are coupled, over conductors 171 and 172, to a normally closed contact set 173 and a normally open contact set 174, operated by "raise" push button 175. Accordingly push buttons 170 and 175 with their associated contact sets are equivalent to the manual control means 36 represented generally in FIGURE 3.

Contact set 173 in its turn is coupled over conductor 176 to fixed contact 68 of the automatic-manual selector switch 35, and contact set 174 is coupled over conductor 177 to fixed contact 67 of this switch. Conductor 134 is shown coupled to the center of a pair of windings 180 and 181 of adjusting motor 22, across which windings capacitor 182 is coupled. Winding 180 is the "raise" winding; that is, upon curent flow through this winding motor 22 is driven in the proper direction to change the connections on transformer 20 to raise or increase the output voltage applied to load 11. Likewise winding 181 is the "lower" winding which when energized drives motor 22 in the opposite direction to change the connections of linear variable transformer 20 to reduce the amplitude of the energizing voltage applied to motor 11. The end of winding 180 remote from the common connection with winding 181 is coupled over a conductor 183 to movable contact 61, and the other end of winding 181 is coupled over a conductor 184 and a limit switch 185 to movable contact 62 of the automatic-manual switch 35. Limit switch 185 is opened only when the movable tap on variable transformer 20 is displaced to the minimum voltage or zero output voltage position, to interrupt the "lower" energizing circuit for motor 22 at such time.

*Operation of volts-per-cycle regulator*

Considering now the volts-per-cycle regulator as depicted in FIGURES 4A and 4B, upon the initiation of system operation it is assumed that automatic-manual switch 35 is in the automatic position, that an appropriate selection of the desired volts-per-cycle ratio has been made by adjusting the position of movable contact 83 of inductor 31, and that the position of the variable transformer as determined by operation of adjusting motor 22 is somewhere near the center of its range. As soon as the power switch (not shown) is closed, input energy appears on conductors 133 and 134, although at this time the inverter is not energized and thus there is no input signal either on conductors 50, 51 or on conductors 54, 55. With no input signal on conductors 54, 55 there is no energy applied to bridge 136 in inverter input sensing stage 33, and thus relay 142 is de-energized at this time.

Responsive to the application of energy to conductors 133, 134, "lower" winding 181 of adjusting motor 22 is energized over a circuit which extends from conductor 133 over contacts 145, 143, conductor 147, contacts 65, 62, limit switch 185, conductor 184, and "lower" winding 181 to conductor 134. Accordingly, the adjusting motor is energized and drives the output transformer in a direction to lower its output voltage after it is energized; upon reaching the minimum position, limit switch 185 is opened by the transformer displacement in a well known manner and motor 22 is thus de-energized. At this time it is assumed that the setting of the transformer is now such that the output volts-per-cycle ratio, were the inverter now energized, would be below that desired by the setting of inductor 31.

As soon as the inverter starts to operate, an output potential is provided over conductors 50 and 51 and, through potentiometer 52 and transformer 77, the offset potential previously described is inserted in the circuit between conductors 70 and 80. Simultaneously the same potential is applied over conductors 50, 51 and resistor 135 to rectifier bridge 136, which in turn applies a unidirectional potential over conductors 138, 140 to winding 141 to effect the operation of relay 142. Relay 142 operates, and at its contacts 143, 145 interrupts the previously described "lower" circuit for the adjusting motor, and at its contacts 144, 146 completes the circuit for applying input energy from the inverter over fuses 148, 153 to transformer 151 in power supply stage 43. This energy is rectified in bridge 155 and passed over conductors 88, 157 to provide requisite bias and energizing potentials for signal conversion stage 40.

In that the inverter is now operating, energy is passed through linear variable transformer 20 and at the output side of the transformer energy is applied over conductors 54, 55 to the primary side of transformer 57 over a previously described circuit which is completed by contacts 63, 66 in automatic-manual switch 35. This energy is passed through Variac 72 and secondary winding 76, to apply to inductor 31 a composite potential representing the output potential from transformer 20 as modified by the offset potential applied over transformer 77. In that adjusting motor 22 has already been energized and driven to reduce the output voltage of variable transformer 20 below that desired by the setting of inductor 31, there is no appreciable current flow over conductors 70, 86 and thus transistors 97, 103 in signal conversion stage 40 remain nonconducting at this time. In that these transistors are not conductive, each of relays 108 and 120 is also de-energized at this time.

It has been noted that, when a signal appears at the output side of the inverter, relay 142 is operated to close contact set 144, 146. Upon closure of this contact set, an energizing circuit for "raise" winding 180 of adjusting motor 22 is completed from input conductor 133 over contacts 146, 144, fuse 153, conductor 186, contacts 111, 115, conductor 131, contacts 124, 121, conductor 132, contacts 64, 61, conductor 183, and "raise" winding 180 to conductor 134. Thus adjusting motor 22 is driven, but only after the transformer 20 is in its minimum voltage position and the inverter is operating, to continually raise the output voltage at the secondary side of linear variable transformer 20 toward the value which will provide the desired volts-per-cycle ratio. This operation is in response to a first control signal, denoted by zero or negligible current flow, applied from comparison sensing stage 32 over conductors 70, 86 to signal conversion stage 40. It is noted that, as soon as this increasing or voltage-raising movement is started, limit switch 185 is closed to prepare the "lower" circuit for subsequent energization.

As the volts-per-cycle ratio of the output energy from variable transformer 20 reaches the level preset by actuation of movable contact 83, inductor 31 saturates and begins to pass current over conductors 70, 86 to rectifier bridge 87 in signal conversion stage 40. The different levels of bias potential applied to transistors 97 and 103 have been previously described, and as an increasingly positive signal is applied over conductor 92 to the bases of these two transistors, transistor 103 conducts first and relay 120 is energized. This operation is considered as occurring when a second control signal, denoted by a current flow sufficient to cause operation of relay 120, is passed over conductors 70, 86 to the signal conversion stage. Relay 120 operates, and at its contacts 121, 124 interrupts the previously described "raise" energizing circuit for the adjusting motor, thereby stopping this motor and likewise halting adjustment of the setting of linear variable transformer 20.

So long as the volts-per-cycle ratio remains at or near the preset level, transistor 103 conducts while transistor 97 remains non-conducting, and there is no operation of adjusting motor 22. Should the volts-per-cycle ratio of the output potential from transformer 20 increase beyond the preset level, a third control signal, represented by the increasingly positive bias potential, is applied over conductor 92 to gate on transistor 97, thus passing current through winding 107 to energize relay 108, while relay 120 remains energized. Relay 108 operates and its contacts 110, 112, complete an energizing circuit for "lower" winding 181, which circuit extends from conductor 133 over contacts 146, 144, fuse 153, conductor 186, contacts 122, 125, conductor 130, contacts 110, 112, conductor 128, contacts 65, 62, limit switch 185, conductor 184, and "lower" winding 181 to conductor 134. Accordingly, the output volts-per-cycle ratio is decreased until transistor 97 is again turned off, releasing relay 108 and interrupting the described "lower" circuit to halt motor 22. Should the output voltage decrease further, to the point where transistor 103 is also shut off, relay 120 is also released and the previously described "raise" circuit is again completed to increase the output voltage from the transformer and provide the desired volts-per-cycle ratio. To avoid hunting of the system, a "dead band" is provided by establishment of the different bias levels, effected by movable arms 161 and 163 of the two potentiometers 160 and 162. It will be readily apparent to those skilled in the art that the settings of these two movable arms can be varied in an appropriate manner to establish the extent of the dead band between the "raise" and "lower" energizing points for the adjusting motor 22. Inclusion of this dead band region obviates any tendency the system might otherwise have to oscillate around one or two wires of the linear variable transformer 20.

If manual control of the adjusting motor operation is desired, automatic-manual switch 35 is displaced so that movable contacts 61–63 engage fixed contacts 67–69, respectively. To raise the position of the taps on the output transformer and increase the output voltage, "raise" button 175 is pushed to close contact set 174, completing an energizing circuit for "raise" winding 180 of the adjusting motor. This circuit extends from conductor 133 over contact set 168, conductor 172, contact set 174, conductor 177, contacts 67, 61, conductor 183, and "raise" winding 180 to conductor 134. Upon release of button 175, this circuit is interrupted at contact set 174 to halt the adjusting motor. In like manner, actuation of "lower" button 170 completes an energizing circuit for "lower" winding 181 which extends from conductor 133 over contact set 167, conductor 171, contact set 173, conductor 175, contacts 68, 62, limit switch 185, conductor 184, and "lower" winding 181 to conductor 134. Release of the "lower" button 170 interrupts this circuit at contact set 167 to halt movement of the adjusting motor and displacement of the taps of the variable ouput transformer.

*Summary*

The present invention provides an effective and efficient system for regulating the volts-per-cycle ratio passed from an output transformer to a load such as an induction motor. It is again emphasized that the motor is protected against an excess volts-per-cycle energization when the equipment is started, by providing normally closed contacts 143, 145 in the inverter output sensing stage 33 to complete a circuit which drives adjusting motor 22 to place output transformer 20 in the minimum voltage position before the remainder of the system is energized. The desired volts-per-cycle ratio is easily set by the displacement of movable contact 83 to engage one of taps 84 on inductor 31, and a compensating voltage adjustment is likewise readily effected by displacement of arm 53 of potentiometer 52. Hunting of the equipment is precluded by the inclusion of two separate transistors with different bias levels established by the positions of the movable arms of potentiometers 160 and 162. If it is desired to displace the output transformer manually, this is readily accomplished by the push-button switches 170 and 175 in the automatic/manual switching stage 34.

Although only particular embodiments of the invention have been described and illustrated, it is apparent that modifications and alterations may be made therein. It is, therefore, the intention in the appended claims to cover all such modifications and alterations as may fall within the true spirit and scope of the invention.

What is claimed is:

1. A control system for regulating the volts-per-cycle ratio of energy passed from an alternating energy supply to an electrical load, comprising
   a transformer rectifier for receiving the alternating energy and providing a substantially constant DC output voltage,
   an inverter coupled to said transformer rectifier for energization by said substantially constant DC output voltage from the transformer rectifier to produce an alternating output voltage,
   frequency regulating means coupled to said inverter for governing the rate of alternation of its output voltage, and
   variable transformer means, coupled between said inverter and the electrical load, for providing a variation in the output voltage level of the transformer, to supply the load with energy of a substantially constant volts-per-cycle ratio.

2. A control system for regulating the volts-per-cycle ratio of energy passed from an alternating energy supply to an electrical load, comprising
   a transformer rectifier for receiving the alternating energy and providing a substantially constant DC output voltage,
   an inverter coupled to said transformer rectifier for energization by said substantially constant DC output voltage from the transformer rectifier to produce an alternating output voltage,
   oscillator means coupled to said inverter for regulating the frequency of alternation of the inverter output voltage as a function of the frequency of the oscillator output signal,
   variable transformer means, coupled between said inverter and the electrical load, and
   adjusting means, coupled to the variable transformer, for changing the position of a control element to provide a related variation in the output voltage level of the transformer, to energize the load with power of a substantially constant volts-per-cycle ratio.

3. A control system for regulating the amplitude and the frequency of electrical energy passed from an alternating energy supply to a load, comprising
   a transformer rectifier for receiving the alternating energy and providing a substantially constant D.C. output voltage,
   an inverter, coupled to said transformer rectifier, for energization by said substantially constant D.C. output voltage from the transformer rectifier to provide an alternating output voltage,
   means, coupled to said inverter, for regulating the frequency of alternation of its output voltage, variable transformer means, coupled between said inverter and the load, for energizing the load with an output voltage of adjustable level, adjusting means for regulating the level of the output voltage from said variable transformer, and regulating means, for sensing deviation of the transformer output voltage from a preset volts-per-cycle ratio, and for controlling said adjusting means to regulate the transformer output voltage in accordance with said preset ratio.

4. A control system for regulating the amplitude and the frequency of electrical energy passed from an alternating energy supply to a load, comprising a transformer rectifier for receiving the alternating energy and providing a substantially constant D.C. output voltage, an inverter, coupled to said transformer rectifier, for energization by said substantially constant D.C. output voltage from the transformer rectifier to provide an alternating output voltage, means, coupled to said inverter, for regulating the frequency of alternation of its output voltage, variable transformer means, coupled between said inverter and the load, for energizing the load with an output voltage of adjustable level, an adjusting motor for regulating the level of the output voltage from said variable transformer, and regulating means, including adjustable means for presetting a desired volts-per-cycle ratio, and means including said adjustable means for comparing the variable transformer output voltage against the preset ratio to provide a control signal to operate said adjusting motor to regulate the transformer output voltage in accordance with said preset ratio.

5. A control system for regulating the volts-per-cycle ratio of electrical energy passed from an alternating energy supply to an induction motor, comprising a transformer rectifier for receiving alternating energy and providing a substantially constant D.C. output voltage, an inverter, coupled to said transformer rectifier, for energization by the D.C. output voltage to provide an alternating output voltage, oscillator means, coupled to said inverter, including control means for regulating the frequency of its output signal, variable transformer means, coupled between said inverter and the induction motor, for energizing the motor with an output voltage of adjustable level, an adjusting motor connected to regulate the output voltage level of the variable transformer, and regulating means including adjustable inductor means having a square saturation characteristic to block current flow until the preset volts-per-cycle ratio is reached, input means for applying to the inductor means a signal related to the output voltage passed from the variable transformer to the induction motor, and means intercoupling the inductor means and the adjusting motor for applying a control signal to said adjusting motor to regulate the transformer output voltage in accordance with said preset volts-per-cycle ratio.

6. A control system as set forth in claim 5 in which said regulating means includes a manual/automatic switching stage for determining the type of system control and switching means in said stage for selectively operating the adjusting motor when the system is conditioned for manual control.

7. A control system for regulating the volts-per-cycle ratio of electrical energy passed from an alternating energy supply to an induction motor, comprising a transformer rectifier for receiving alternating energy and providing a substantially constant D.C. output voltage, an inverter energized by the D.C. output voltage of the transformer rectifier to provide an alternating output voltage, an oscillator having an adjustable frequency output signal, connected to regulate the operating frequency of the inverter, a variable amplitude transformer, coupled between the inverter and the induction motor, for energizing the induction motor with an output voltage of adjustable level, an adjusting motor connected to regulate the output voltage level of the variable transformer, and regulating means, connected to sense deviation of the transformer output voltage from the level required to maintain a preset volts-per-cycle ratio, and for controlling said adjusting motor by providing a first control signal when the transformer output voltage is below said required level, a second control signal when the transformer output voltage is approximately equal to said required level, and a third control signal when the transformer output voltage is higher than said required level, thereby to regulate the transformer output voltage in accordance with said required level and thus maintain the preset ratio.

8. A control system for regulating the volts-per-cycle ratio of electrical energy passed from an alternating energy supply to an induction motor, comprising a transformer rectifier for receiving alternating energy and providing a substantially constant D.C. output voltage, an inverter, coupled to said transformer rectifier, for energization by the D.C. output voltage to provide an alternating output voltage, oscillator means, coupled to said inverter, including control means for regulating the frequency of its output signal, variable transformer means, coupled to said inverter, for energizing the induction motor with an output voltage of adjustable level, an adjusting motor connected to regulate the output voltage of the variable transformer, and regulating means, including a comparison sensing stage having an adjustable inductor with a square saturation characteristic to block current flow until the preset volts-per-cycle ratio is reached, means for applying to the comparison sensing stage a signal related to the output voltage level passed from the variable transformer to the induction motor, and a signal conversion stage coupled between the comparison sensing stage and the adjusting motor, for controlling said adjusting motor to regulate the transformer output voltage in accordance with said preset volts-per-cycle ratio.

9. A control system as set forth in claim 8 in which said regulating means comprises a power supply stage connected to energize said signal conversion stage responsive to receipt of input energy, and an inverter output sensing stage, coupled between said inverter and said power supply stage, for passing input energy to the power supply stage only after receiving a signal indicating the inverter is operating.

10.. A control system as set forth in claim 8 in which said regulating means comprises an inverter output sensing stage, coupled between the inverter and the adjusting motor, operative to drive the adjusting motor to provide minimum output voltage from the variable transformer in the absence of an output signal from the inverter.

11. The method of regulating the volts-per-cycle ratio of energy passed from an alternating energy supply to an induction motor, comprising the steps of rectifying the alternating input energy to provide a substantially constant DC voltage, inverting said substantially constant DC voltage to provide an alternating energizing potential, regulating the frequency of the alternating energizing potential in accordance with the desired motor speed, passing the frequency-regulated energy over a variable amplitude transformer to the induction motor, and adjusting the amplitude of the energy passed over the transformer to the induction motor to maintain the desired volts-per-cycle ratio.

12. The method of regulating the volts-per-cycle ratio of energy passed from an alternating energy supply to an induction motor, comprising the steps of rectifying the alternating input energy to provide a substantially constant DC voltage, inverting said substantially constant DC voltage to provide an alternating energizing potential, regulating the frequency of the alternating energizing potential in accordance with the desired motor speed, passing the frequency-regulated energy over a variable amplitude transformer to the induction motor, setting an adjustable inductor to preset a desired volts-per-cycle ratio, applying a signal from said variable amplitude transformer to the inductor to provide a control signal related to the difference between the preset and the actual volts-per-cycle ratios, and utilizing the control signal to adjust the amplitude of the energy passed over the transformer to the induction motor to maintain the desired volts-per-cycle ratio.

13. In a control system for an induction motor in which AC energy is received over an input circuit, including a rectifier circuit coupled to the input circuit to provide a DC voltage, an inverter coupled to the rectifier circuit for energization by the DC voltage to produce an AC output voltage, a frequency-varying circuit coupled to the inverter to regulate the frequency of the inverter AC output voltage, and a voltage level regulating means coupled between the inverter and the motor to regulate the amplitude of the AC voltage passed to the motor and correspondingly regulate the volts-per-cycle ratio of the AC voltage passed to the motor, the improvement when comprises a constant volts-per-cycle regulator including a comparison sensing circuit having an adjustable impedance portion with manual control means actuable to vary the effective impedance value of said adjustable impedance portion and thus preset a desired volts-per-cycle ratio, circuit means connected to apply to the adjustable impedance portion of the comparison sensing circuit a signal related to the actual volts-per-cycle ratio of the AC voltage passed from the voltage level regulating means to the motor, to produce at the output side of the comparison sensing circuit a control signal carrying information indicating whether the actual volts-per-cycle ratio is less than, substantially equal to, or greater than the preset volts-per-cycle ratio, and a signal conversion circuit, coupled between the comparison sensing circuit and the voltage level regulating means, including switching means connected for operation in accordance with the information carried by the control signal to adjust the operation of the voltage level regulating means in the proper sense and by the proper amount to regulate the amplitude of the AC voltage passed to the motor and maintain the actual volts-per-cycle ratio substantially equal to the preset volts-per-cycle ratio.

References Cited

UNITED STATES PATENTS

| | | | |
|---|---|---|---|
| 2,585,573 | 2/1952 | Moore | 318—231 |
| 2,623,203 | 12/1952 | Demuth | 318—231 X |
| 2,784,365 | 3/1957 | Fenemore et al. | 318—231 X |
| 3,105,180 | 9/1963 | Burnett | 318—231 X |

ORIS L. RADER, *Primary Examiner.*

G. Z. RUBINSON, *Assistant Examiner.*